United States Patent [19]

Hull-Allen

[11] Patent Number: 5,436,462
[45] Date of Patent: Jul. 25, 1995

[54] VIDEO CONTOUR MEASUREMENT SYSTEM EMPLOYING MOIRE INTERFEROMETRY HAVING A BEAT FREQUENCY PATTERN

[75] Inventor: C. Gregory Hull-Allen, Jupiter, Fla.

[73] Assignee: United Technologies Optical Systems, West Palm Beach, Fla.

[21] Appl. No.: 171,559

[22] Filed: Dec. 21, 1993

[51] Int. Cl.[6] .............................. G02B 27/42
[52] U.S. Cl. ............................ 250/550; 356/374
[58] Field of Search ............ 250/550, 560, 561; 356/374, 376; 348/136

[56] References Cited

U.S. PATENT DOCUMENTS

| | | | |
|---|---|---|---|
| 3,614,237 | 10/1971 | Kyle et al. | 356/156 |
| 4,212,073 | 7/1980 | Balasubramanian | 356/376 |
| 4,794,550 | 12/1988 | Grievenkamp, Jr. | 250/550 |
| 4,939,380 | 7/1990 | Berger et al. | 356/374 |
| 5,075,560 | 12/1991 | Greivenkamp, Jr. et al. | 250/561 |
| 5,075,562 | 12/1991 | Grievenkamp, Jr. et al. | 250/561 |
| 5,102,223 | 4/1992 | Uesugi et al. | 250/550 |
| 5,155,371 | 10/1992 | Burggraf et al. | 250/563 |

Primary Examiner—David C. Nelms
Assistant Examiner—Que T. Le
Attorney, Agent, or Firm—McCormick, Paulding & Huber

[57] ABSTRACT

An electroptic metrology system uses Moire interferometry to generate contour information on the surface of an object. Interfering coherent beams generate an image on the object's surface that includes a stripe pattern. The surface is viewed with a high resolution camera and digitized using a frame grabber and computer. A reference pattern is generated in software and is mixed with the digitized object surface signals. The mixed signals are filtered to remove signals at the carrier frequency and signals containing the beat frequency indicative of the surface contours are output.

32 Claims, 8 Drawing Sheets

VIDEO CONTOUR MEASUREMENT SYSTEM EMPLOYING MOIRE INTERFEROMETRY HAVING A BEAT FREQUENCY PATTERN

TECHNICAL HELD

The present invention relates to optical metrology generally and more particularly to a contour measurement system employing Moire interferometry.

BACKGROUND OF THE INVENTION

Systems for surface measurement are generally well known and have found application through industry and science. For example, jet engine turbine blades have many intricate features, including a multitude of coolant hole patterns and severe surface contours. Current inspection approaches for precision measurement of surface features are embodied in commercial coordinate measurement machines (CMMs). These systems use contact probe devices on precision translating mechanisms to measure a limited number of points on the part being inspected. In general, the part is stationary and the probe moves. Great care is taken to maintain accurate knowledge of the probe position. The inspection process is relatively slow because it is a sequential point-by-point process. The accuracy of the known and relatively fast ADAM machine is approximately 2 mils for a surface point size of approximately 0.0625 inches square. The much slower CMM units achieve about a 0.5 rail accuracy for a single point. As the complexity of the parts and the amount of time required for inspection increases, these approaches will become more and more limiting to future production processes.

Optical metrology techniques, in general, offer a way to increase the speed of the inspection process. This is because they are inherently 1- or 2-dimensional in nature, permitting an entire line segment or an area patch on a blade to be observed at once. With this observational speed, it becomes possible to determine the, entire surface contour, permitting a more thorough inspection than a limited contact probe or other sequential point-by-point measurement system would support. Until now, however, the available optical systems-have not had the accuracy and ruggedness to meet production inspection requirements.

One optical technique that is well suited to this application is Moire Interferometry. A Moire pattern is an intensity pattern (fringes) formed from the interference or light blocking when gratings, screens, or regularly spaced patterns are superimposed on one another. The interference fringes are most noticeable when the frequencies of the two interfering patterns are nearly the same. Common examples would be the shimmering phenomenon encountered when viewing through two separated screen windows or the shimmering pinstripe suit as seen on a television screen. When the spatial frequency of the pinstripes is closely matched to the pixel frequency of the TV camera, a Moire pattern appears.

Moire contouring techniques have been used for the accurate contouring of fairly elaborate surfaces. However, this technique has several fundamental drawbacks: 1) The geometry of the viewing system cannot allow for the measurement of large slopes; 2) the size of the grid and the viewing angle place stringent constraints on the size of the object; and 3) the mixing efficiency depends on the camera's ability to focus both the object and the grid at the same time. Moire systems have not been applied as high-throughput metrology instruments due to the tight tolerance required to register the image of the part with the reference grid.

It would be advantageous to have an optical metrologic system using Moire interferometry that was not limited by optical registration or depth of field constraints and yet would provide quick and accurate measurement of an object's surface contours. The present system is drawn towards such an invention.

SUMMARY OF THE INVENTION

An object of the present invention is to provide a system employing Moire interferometry for measuring contours on the surface of an object.

Another object of the present invention is to provide a system of the forgoing type that is characterized by an infinite depth of field.

Another object of the present invention is to provide a system of the forgoing type wherein surface image containing beat frequencies of interfering patterns are accomplished by computer signal processing.

Still another object of the present invention is to provide a system of the forgoing type that replaces existing contouring systems with a time efficient and cost effective alternative.

Another object of the present invention is to provide a system of the forgoing type that provides high throughput, high accuracy, high reliability, and large range of allowable part sizes and shapes.

Yet another object of the present invention is to provide a system of the forgoing type that generates continuous rather than discrete topographical measurements of an objects surface.

Another object of the present invention is to provide a system of the forgoing type characterized by very loose requirements for physical alignment of the object and that requires only a low skill level for operation.

Still another object of the present invention is to provide a system of the forgoing type that employs phase modulation interferometry.

According to the present invention, a system for measuring contours on the surface, of an object includes an apparatus for illuminating the object surface with a beam of light whose intensity cross section includes periodically spaced regions of low intensity at a reference spatial frequency. There is an apparatus for receiving an image reflected off the object surface that has spaced regions of low intensity at an object spatial frequency. Digitizing circuitry is provided for generating digital signal equivalents of the reflected object image. An apparatus is included for electrically mixing the reflected object image digital signals with reference signals corresponding to a pattern having periodically spaced regions of low intensity at a reference spatial frequency to generate combined image signals;, Also included is apparatus for extracting, from the combined image signals, signals corresponding to an intensity pattern having regions of low intensity at a beat frequency and an apparatus for generating output signals indicative of the beat frequency pattern.

DETAILED DESCRIPTION OF THE PREFERRED EMBODIMENT

Moire topography is a contour mapping technique that involves positioning a grating close to an object and observing its shadow on the object through the grating. The resultant Moire fringes correspond to a contour line system of the object, under certain geometrical conditions. The wavelength of the Moire fringes is a function of the grating period and viewing angle.

Figure 1:
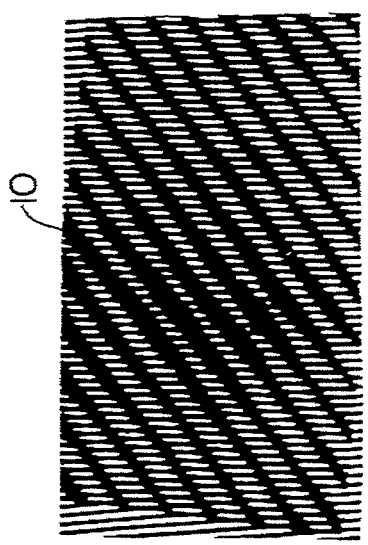
FIG. 1 contains a schematic illustration of a Moire interferogram produce by a known optical system.
Figure 1:
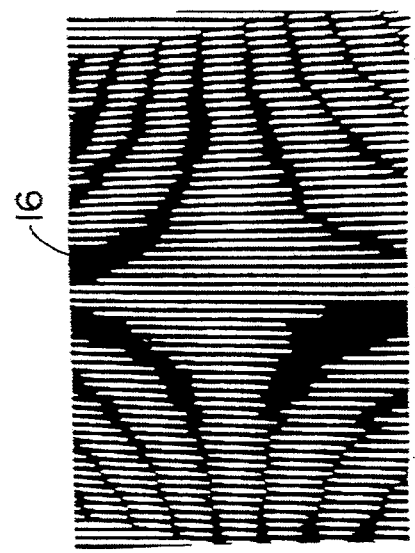
Figure 1:
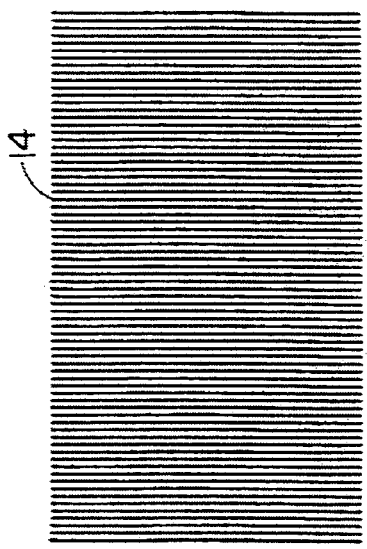
Figure 1:
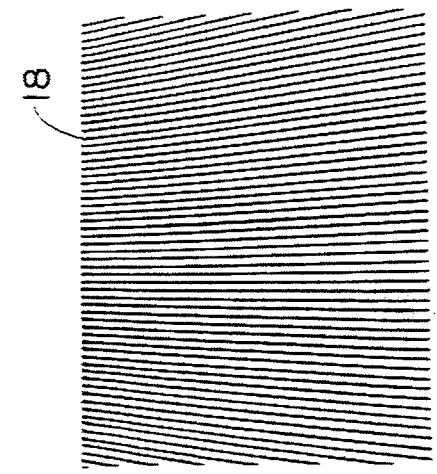
Figure 1:
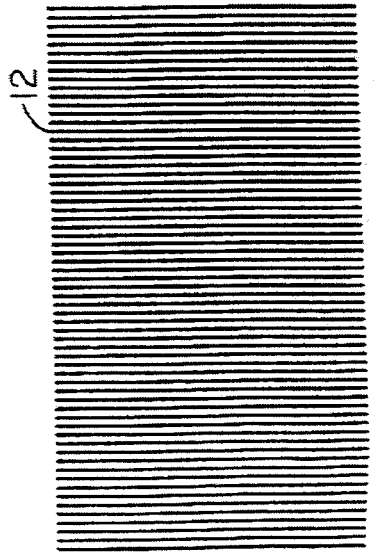
Figure 2:
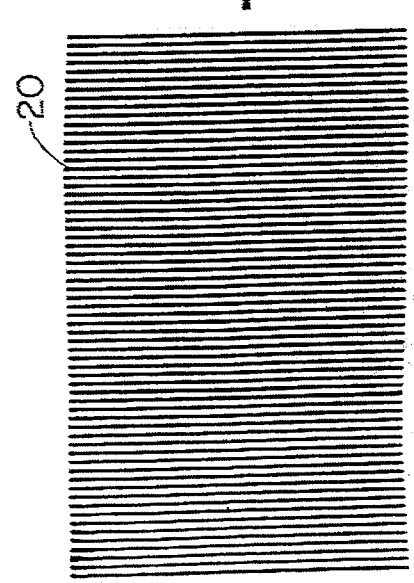
FIG. 2 contains a schematic illustration of a Moire interferogram produce by an optical system alternative to that of FIG. 1.
Figure 3:
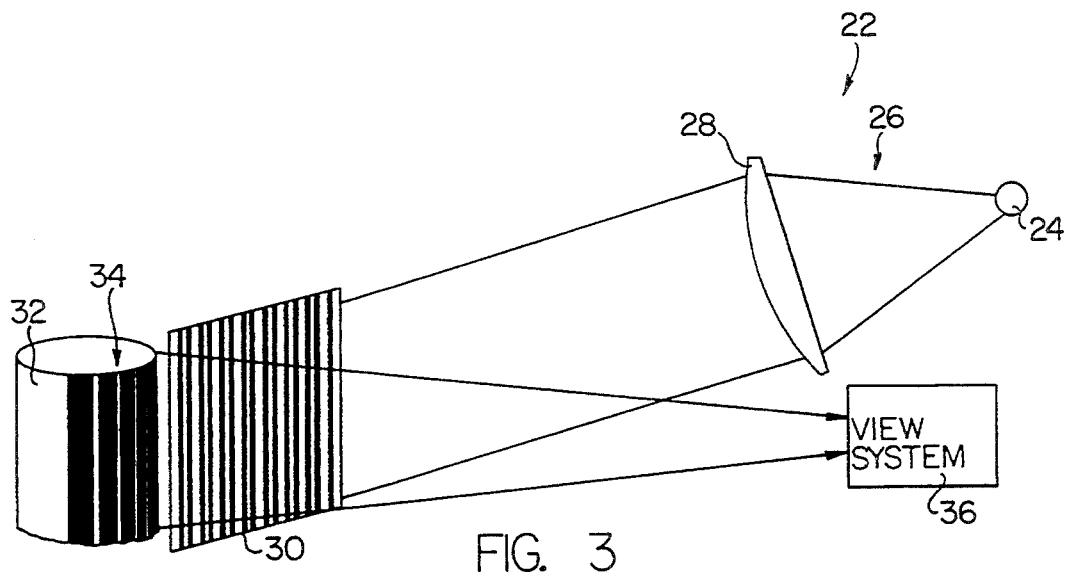
FIG. 3 is a schematic illustration of a known optical system for use generating Moire interferograms.

In FIG. 1, the Moire pattern 10 was created by overlapping transparencies of two patterns 12, 14 each at slightly different spatial frequency and angular orientation. Pattern 16 of FIG. 2 is a slightly more complicated mix in which pattern 18 changes spatial frequency from top to bottom as compared to pattern 20. The patterns 10, 16 can be produced from an optical system 22 that includes an optical source 24 providing a beam 26 to a collimating lens 28. The collimated beam transits a reference grid 30 before illuminating a test object 32. The reflected beam with the varying intensity pattern 34 indicative of the object's surface contours transits through the reference grid again before presentation to viewing system 36.

A contour measurement system provided in accordance with the present invention provides a faster and more accurate method of measuring sophisticated objects such as jet engine blade contours. Time consuming traditional methods of single point analysis are replaced with a higher sampling capability through optical techniques.

A contour measurement system 38 provided in accordance with the present invention involves the mixing of two patterns electronically instead of viewing one pattern through a grid. A coherent monochromatic beam originates from helium neon laser 40. The laser beam is presented to interferometer 42, preferably a modified Mach-Zender interferometer, to generated two beams with an offset and tilt between them. Since the two beams traverse paths that overlap at an angle, they constructively and destructively interfere, producing a sinusoidally varying, intensity distribution (i.e., straight and parallel fringes. Thereafter, the beams are recombined to output an interference beam having a striped cross sectional intensity pattern (i.e., alternating straight line regions of light and dark). In the preferred system, the fringe spatial frequency is adjusted to the resolvability limit of the camera (approximately 30 fringes/inch at the object).

A corresponding pattern of stripes 44 is created on the surface of a test object 46 by the interfering laser beams expanded by beam expander 48 to provide full object illumination. The spatial frequency of the object stripes is a function of both the wavelength of the light and the angle at which the object is viewed, resulting in an equivalent object spatial frequency at some variance with the spatial frequency of the interference beam stripes. Two adjustable mirrors 50, 52 in the interferometer provide control of line spacing and orientation. The fringes are not imaged on the surface. Rather, it is the interference between two beams that takes place on the object surface. Therefore, changes in the depth of the object will not cause the pattern to go out of focus.

The object with its stripe pattern is viewed at an angle with a high resolution video camera 54 and is digitized using frame grabber hardware and software of a known type, all of which comprises part of a video processor 56. The frame grabber creates a digitized signal set corresponding to an image of a portion of the object containing the reference pattern at a particular point in time. Also included in the video processor is a computer, preferably a Microvax minicomputer as marketed by the Digital Equipment Co. with such other conventional hardware and software as is necessary to perform the functions detailed herein. The stored image is mixed and processed with software algorithms in a manner detailed hereinafter. A monitor 58 shows the output of the CCD camera, the reference pattern, the processed interferogram graphics, and/or resultant data as desired. A separate monitor (not shown) can be included to display the processed interferogram.

A mechanical platform, also not shown, provides a stable mount for the optics. The object is placed on a computer controlled precision air bearing platform 60 rotatable in discrete steps to permit measurement of the entire surface contour. The platform also includes a mechanism for raising and lowering the part as required.

An advantage of present system is the ability to mix a computer generated reference pattern with the recorded image of the object. Since the equivalent wavelength of the Moire fringes is based, in part, on the reference interferometer wavelength. Computer generation of the reference grid allows for accurate control of the equivalent wavelength. Also, the depth of the object is irrelevant, since the laser interference pattern will remain the same as long as the beams overlap.

As detailed herein, software generated Moire fringes are feasible and behave as calculated. Signal processing suppresses the Moire carrier frequency without corrupting the beat frequencies. The processed fringes have sufficient signal to noise ratio for repeatable detection by a commercial fringe centroiding program.

The resolution of the preferred system is approximately 0.19 mils at $\lambda_{qp}=0.192$ inches with an equivalent wavelength ($\lambda_{eq}$) range of 0.1 to 0.5 inches. Resolution is limited by the resolution of the video camera used, since the equivalent wavelength is limited by the camera's ability to resolve the fringes on the test object. With a higher density camera pixel array and better optics, an equivalent wavelength of 0.02 inches is obtainable.

The present invention overcomes the alignment and registration difficulties associated with standard Moire implementations. The results shown in the Table I are based on data obtained with an equivalent wavelength of $\lambda_{eq}=0.511$ inches. The performance of the present system scaled to an equivalent wavelength of 0.02 inches is also given

|  | Lab Data in Waves | Data Projected to Instrument Wavelength |
| --- | --- | --- |
| Average Repeatability | 0.004 | 0.0001 inch |
| Accuracy | 0.026 | 0.0005 inch |
| Resolution | 0.001 | 0.000002 inch |

Figure 5:
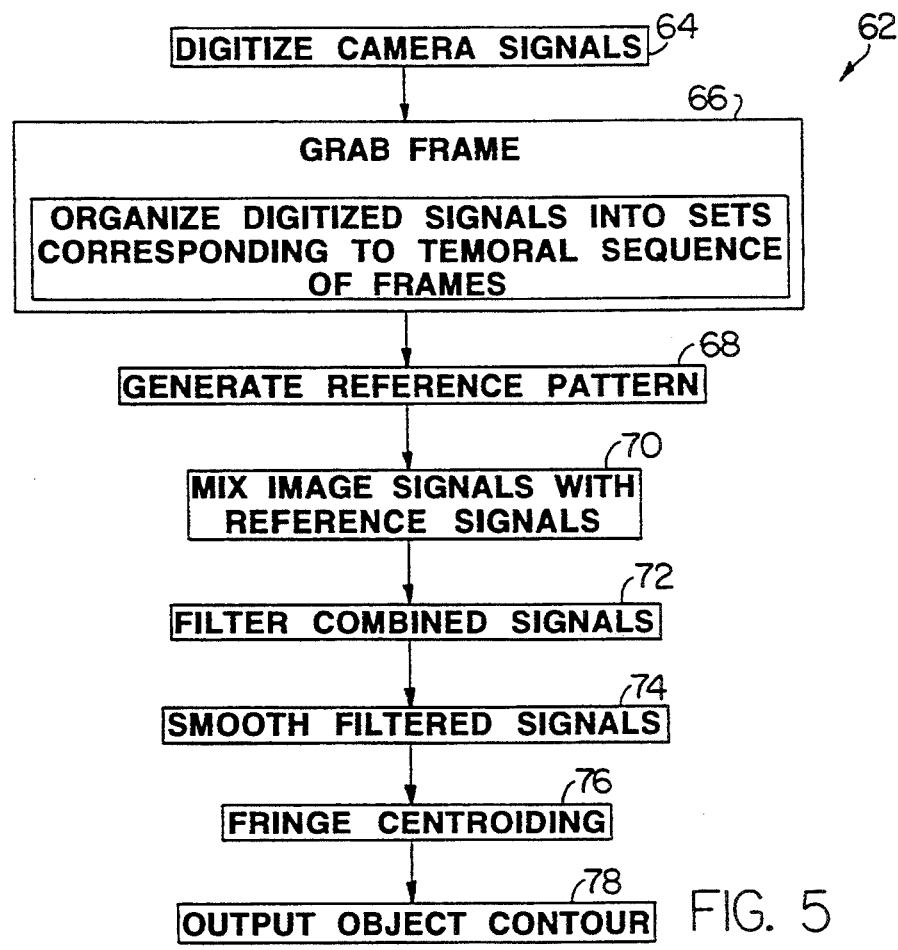
FIG. 5 is a diagrammatic illustration of an algorithm executed by the system of FIG. 4.

FIG. 5 contains a simplified diagrammatic illustration of an algorithm 62 executed by the present invention. In the preferred embodiment, the camera signals are first digitized at block 64. A conventional frame grabber samples the digitized signals (block 66) and arranges the sampled signals into a signal set corresponding to a video image of the object at that moment in time. Subsequent signal sets of object images can be generated in this manner and stored in the computer memory.

The observing pattern in standard Moire systems is replaced by a pattern generated by the computer (block 68). The digitized video image of the object is combined at block 70 with the computer generated pattern internally in a manner corresponding to mathematical mixing of the signals. The orientation, line spacing, and phase of the reference pattern can be altered to control measurement precision, increase processing efficiency, and accommodate various object geometries.

The combined signal set is thereafter electronically filtered (block 72) to remove the illumination pattern and the reference pattern resulting in an interferogram at the desired synthetic wavelength (typically 10–500 mils). The synthetic wavelength will be selected upon determination of the full range of parts requiring inspection. The filtered signals are smoothed (block 74) and a fringe centroiding process is applied to the data as desired (block 76). The system generates output signals corresponding to the object's surface contour (block 78).

With the present invention, the Moire interferogram output from the software image mixer contains not only the desired Moire interference pattern, but also the illumination and reference patterns which mix to form the Moire pattern. However, commercially available software for calculating surface shape from interferograms rely on the presence of a single pattern. Therefore, in order to enhance the Moire interference pattern and suppress the illumination and reference patterns, the Moire image is filtered using image processing software.

Figure 6:
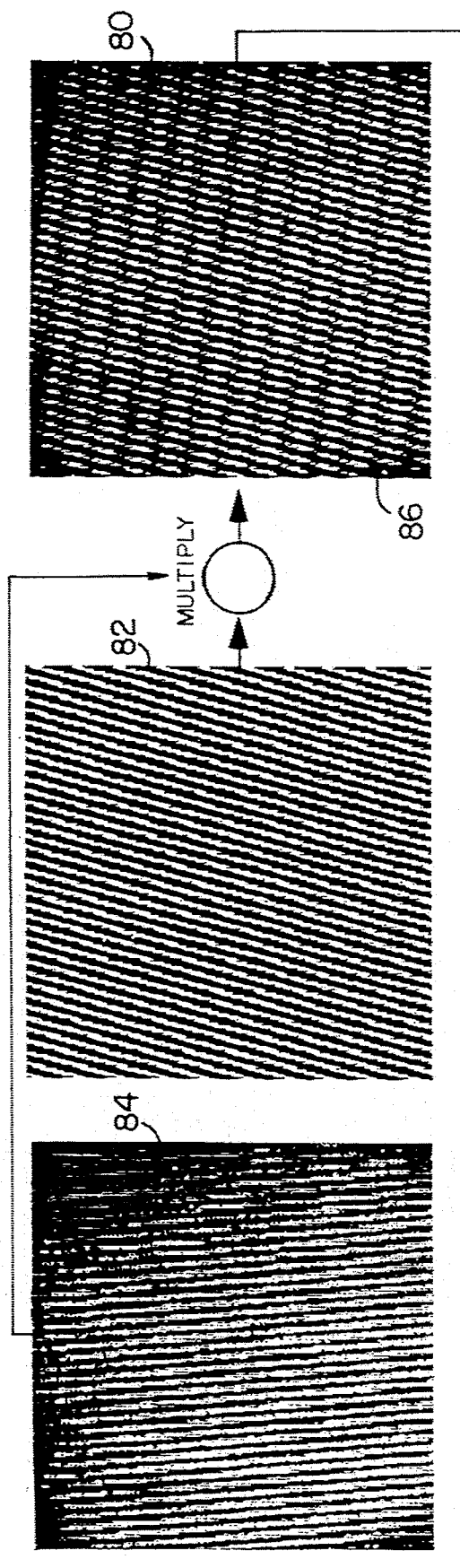
FIG. 6 is a simplified illustration of images generated by the system of FIG. 4 in measuring a flat surface.
Figure 6:
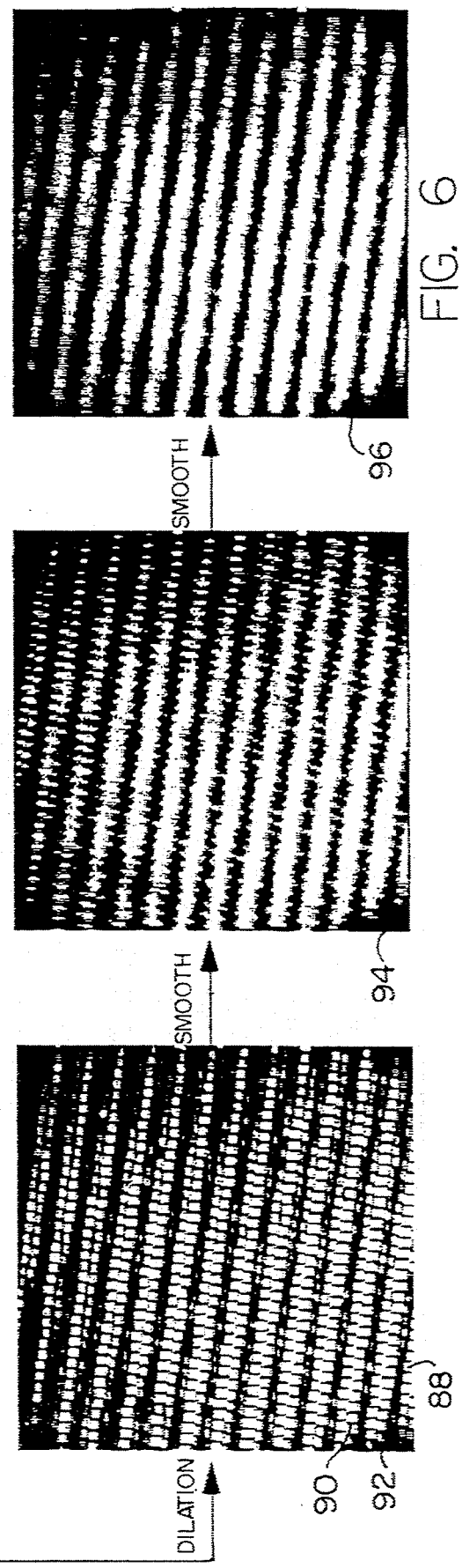

An example of a Moire interference pattern of fringes of a flat surface provided according to the present invention is shown in FIG. 6. Interferogram 80 is formed by the multiplication (or mixing) of a sinusoidal reference pattern 82 with the object pattern 84 acquired using a video camera and a frame grabber in the manner set forth above. Evident in the Moire pattern is the reference pattern; the nearly vertical high spatial frequency light and dark lines.

The detected object pattern is also present in the Moire pattern, but not as evident due to its lower contrast than the reference pattern. The Moire pattern in FIG. 6 is the set 86 of nearly horizontal grey lines which are of lower spatial frequency. The fact that the Moire fringes are straight, parallel, and equally spaced indicates that the surface is planar and tilted with respect to the camera.

The fact that the reference and illumination patterns are of higher spatial frequency than the Moire pattern makes image processing to extract the Moire pattern straight forward. The filtering technique used is a popular non-linear morphological filter called "dilation", followed by a smoothing function, results of which are shown in FIG. 6. Image 88 has a resolution of 150×150 pixels and dynamic range 256 shades of gray, with white denoting high intensities and black denoting low intensities. The dilation filter algorithm used was of size 1×3 pixels (1 pixel high by 3 pixels wide). This size and shape were chosen based on the reference pattern to be removed, which is known in advance.

The process of dilation treats this 1×3 filter as a simple window that is passed over the whole 150×150 image array. Using this window centered on a given pixel in the input, the intensity maximum within this window, i.e., of the selected pixel and its left and right neighbors, is the value assigned to the corresponding pixel in the output image. The effect of this operation is the expansion or "dilation" (in the horizontal direction) of the fine white lines due to the illumination and reference patterns.

As shown in FIG. 6, applying the dilation filter results in white lines 90 expanding and dark lines 92 shrinking until the dark lines disappear. Knowing the width of these lines a priori, the number of iterations required is easily determined. However, dilation does introduce artifacts. For instance, smooth light-dark transitions become slightly rough and pixelated. To remove these artifacts, the image signals are passed twice through a simple linear smoothing filter of size 3×3 pixels, yielding images 94 and 96. Image 96 is free of the high frequency illumination and reference patterns and contains only the smooth Moire pattern.

Figure 7:
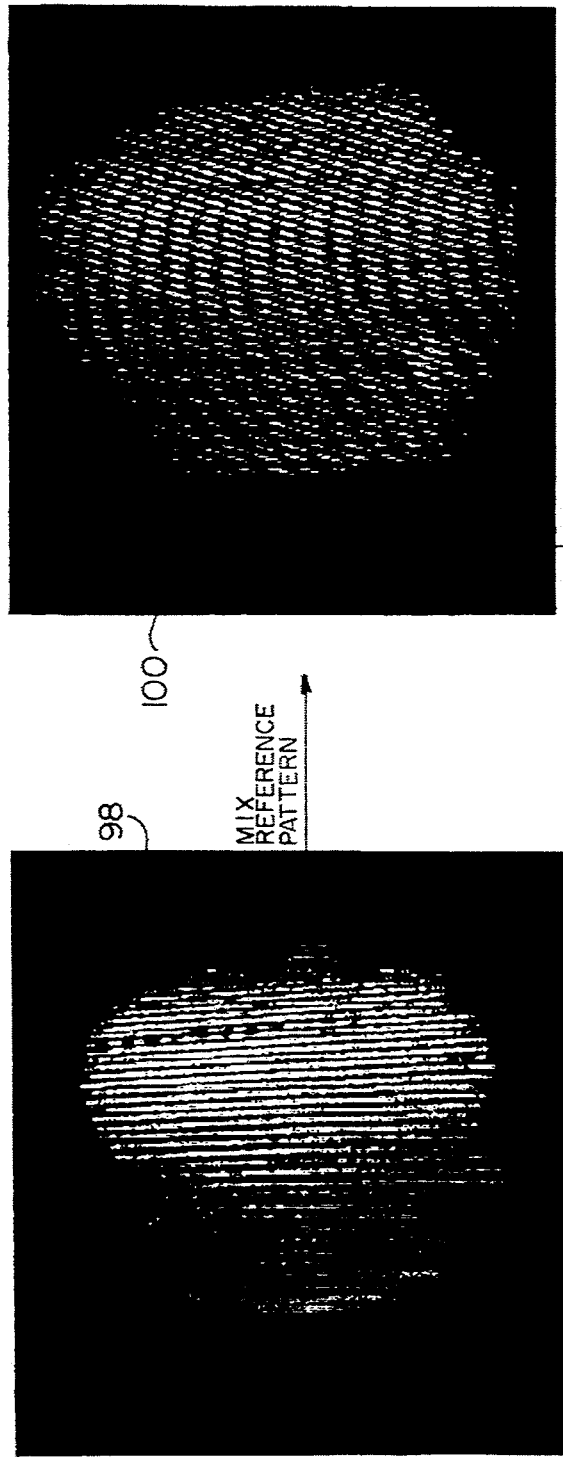
FIG. 7 is a simplified illustration of images generated by the system FIG. 4 in measuring a jet engine turbine blade.
Figure 7:
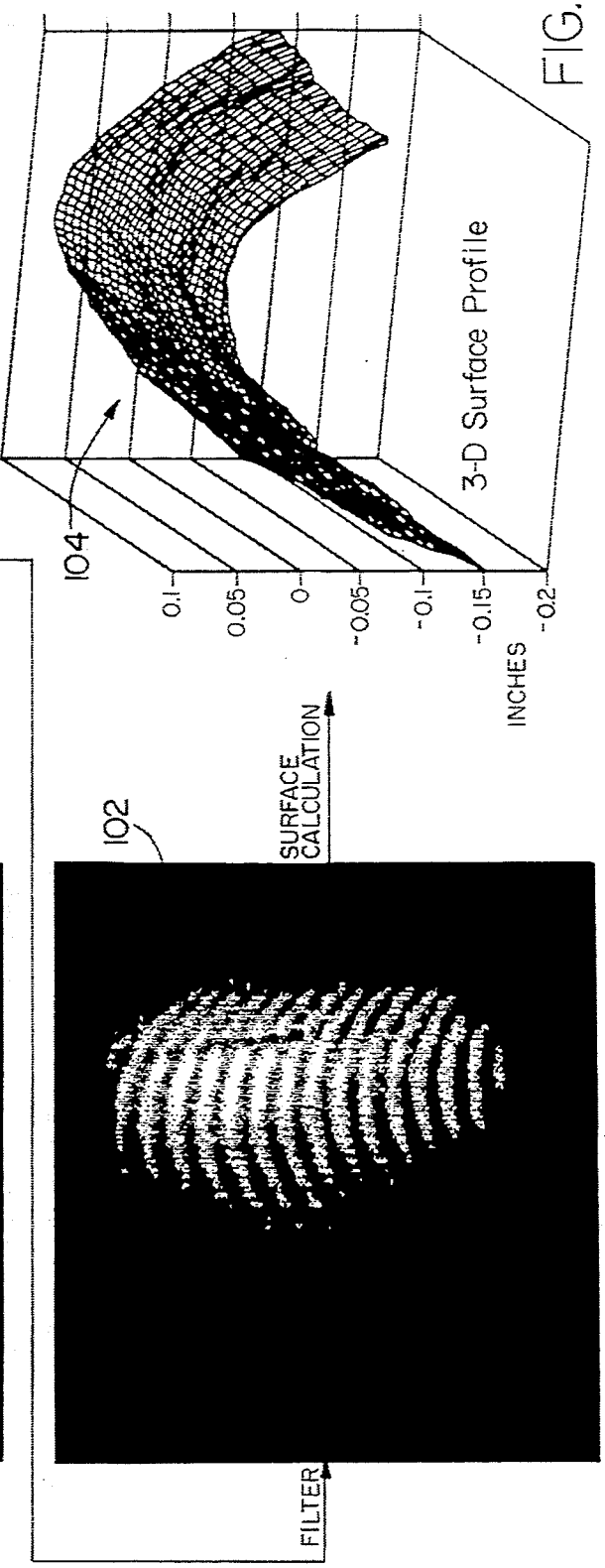

An example of this image processing applied to an interferogram of an jet turbine blade is shown in FIG. 7. The blade sampled signal set generates image 98 which is mixed with a reference pattern to yield interferogram 100. The interferogram signal set is passed through a filtering program to generate image 102. Note that the Moire pattern extracted is now a set of curved lines shown diagrammatically at curve 104, equivalent to lines of equal contour which describe the 3-D surface shape of the region of the examined blade.

Figure 8:
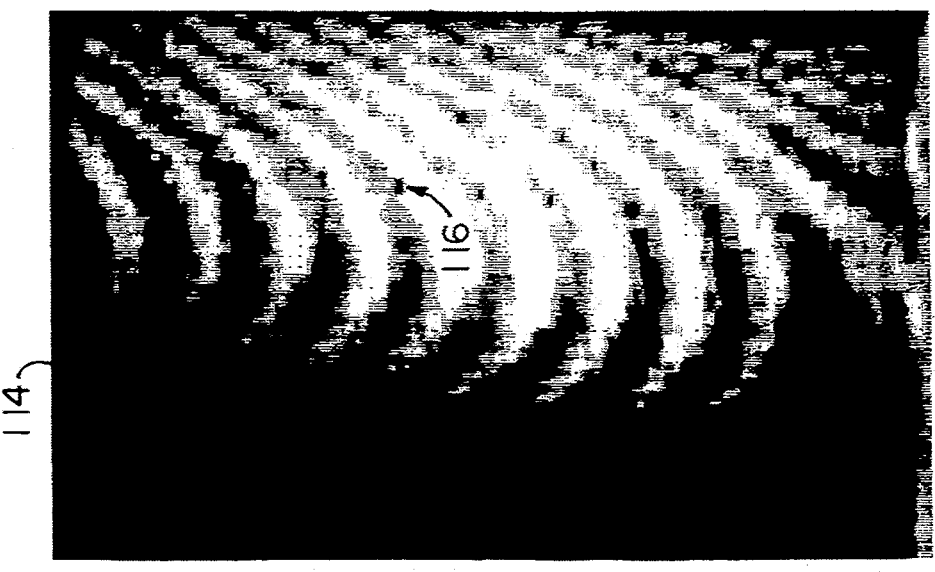
FIG. 8 is a simplified illustration of images generated by the system FIG. 4 showing holes in a jet engine turbine blade.
Figure 8:
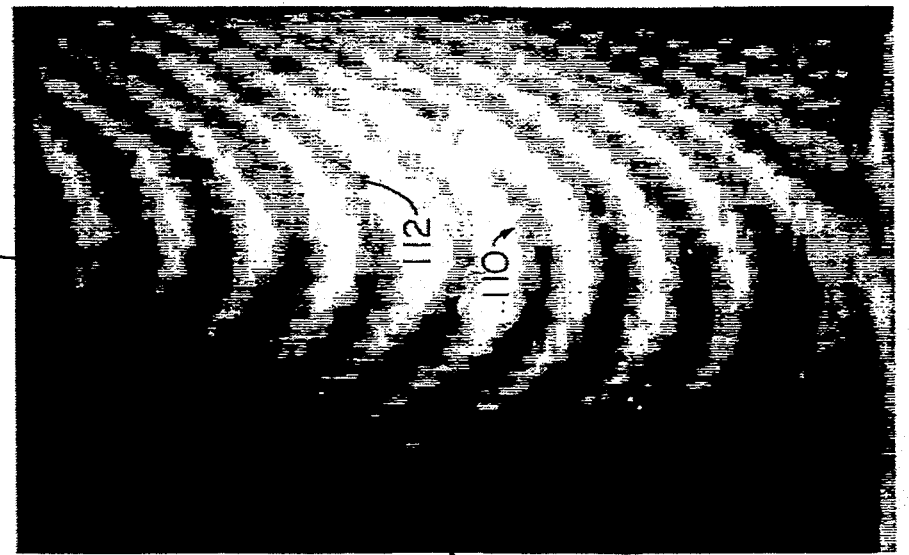
Figure 8:
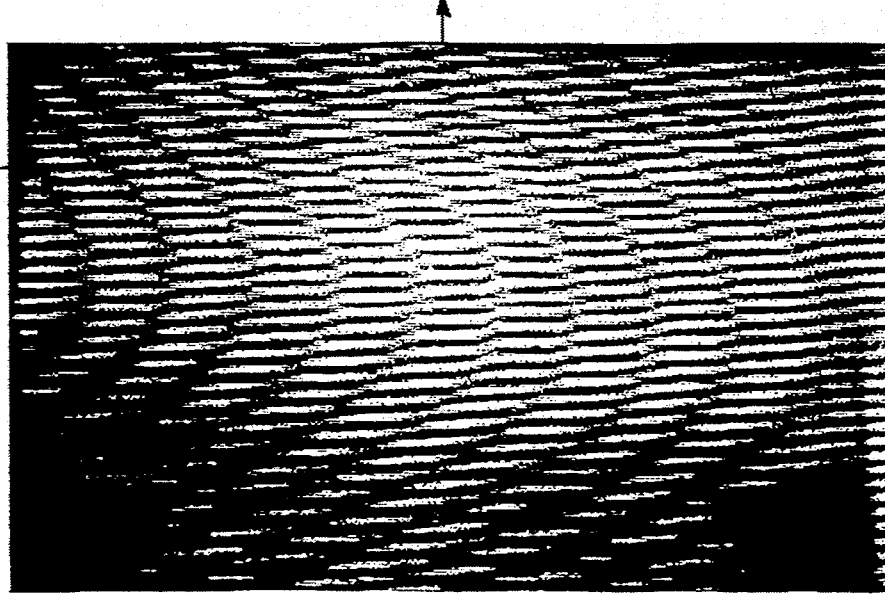

The present invention also detects surface feature as illustrated in FIG. 8. The input object image is shown at 106 while image 108 corresponds to the Moire interferrogram. Note from the image of Moire fringes 110 that a vertical set of small dark regions 112 is evident which could not be seen in the original image. These regions correspond to the locations of holes in the turbine blade. Further image processing, including thresholding and a technique known as "histogram equalization" applied to the image of the Moire pattern (although far from being optimized), yields an image 114 of higher contrast with holes 116 detected.

General purpose commercial image processing software is available for use in some of the above signal processing. Speed and input/output (I/O) characteristics; of commercial software may make the integration and performance of this software unattractive, however. The operations required are, for the most part not complex, and therefore a customized routine written to take advantage of characteristics; of the host computer (math coprocessor, integer or floating point arithmetic, image filtering hardware, etc.) may be utilized depending on application.

The Moire interference fringes, which are extracted from interferograms via image processing, contain three dimensional surface profile information of the illuminated object. The calculation of surface profile from interference fringes is a technique commonly used in optical testing to measure surface deviations to 1/1000 of the wavelength of light. By calibrating such methods by the equivalent Moire wavelength, 3-D surface shape can be calculated from the Moire pattern to the same resolution. Two commonly used techniques for calculating surface shape from interference patterns are fringe centroiding and phase measurement interferometry (PMI).

Fringe centroiding, the simplest of the two surface calculation techniques, uses a single interference pattern to calculate the 3-D surface shape. Given an interference pattern, the algorithm calculates intensity centroids along individual dark or light fringes. The result is a set of connected line segments for each fringe which follow the centroid of a fringe from one side of the pattern to the other, i.e., a piece-wise linear approximation to the fringe shape. These extracted fringes correspond to height changes on the object surface of one equivalent wavelength. Therefore, the extracted fringes are easily mapped from 2-D image space to 3-D physical space. The fringes in 3-D space represent samples, or lines of equal contour, of the 3-D surface being measured. Various interpolation and surface fitting techniques can then be used to fit a surface to the fringe samples or to interpolate between fringe samples, providing a 3-D profile of the entire surface with uniform sample spacing.

An example illustrating the surface calculated for a portion of an jet engine turbine blade is shown in FIG. 6 at curve 104 (units of the figure are inches), where simple linear interpolation was used to fill in the areas between the fringes. Note from the figure that the surface calculated appears to be slightly wavy. This illustrates an inherent problem with this technique. Whereas the total surface shape is calculated from sparse data (only the fringes), it is not very accurate. Small errors in the placement of the fringe centroids due to noise can result in errors over a whole area of the surface profile.

Phase Measurement Interferometry (PMI) is a much more accurate and repeatable technique which utilizes every intensity sample in an input image (instead of only the fringes), and does not require any interpolation. The method has been successfully employed for many years in optical metrology and the present invention adapts PMI to Moire interferometer. The nature of the PMI process allows for data acquisition at any and all points in the video image without any sign ambiguities, and measurements are independent of fringe contrast or irradiance variations across the field. Also, the process is automated and very rapid.

Figure 9:
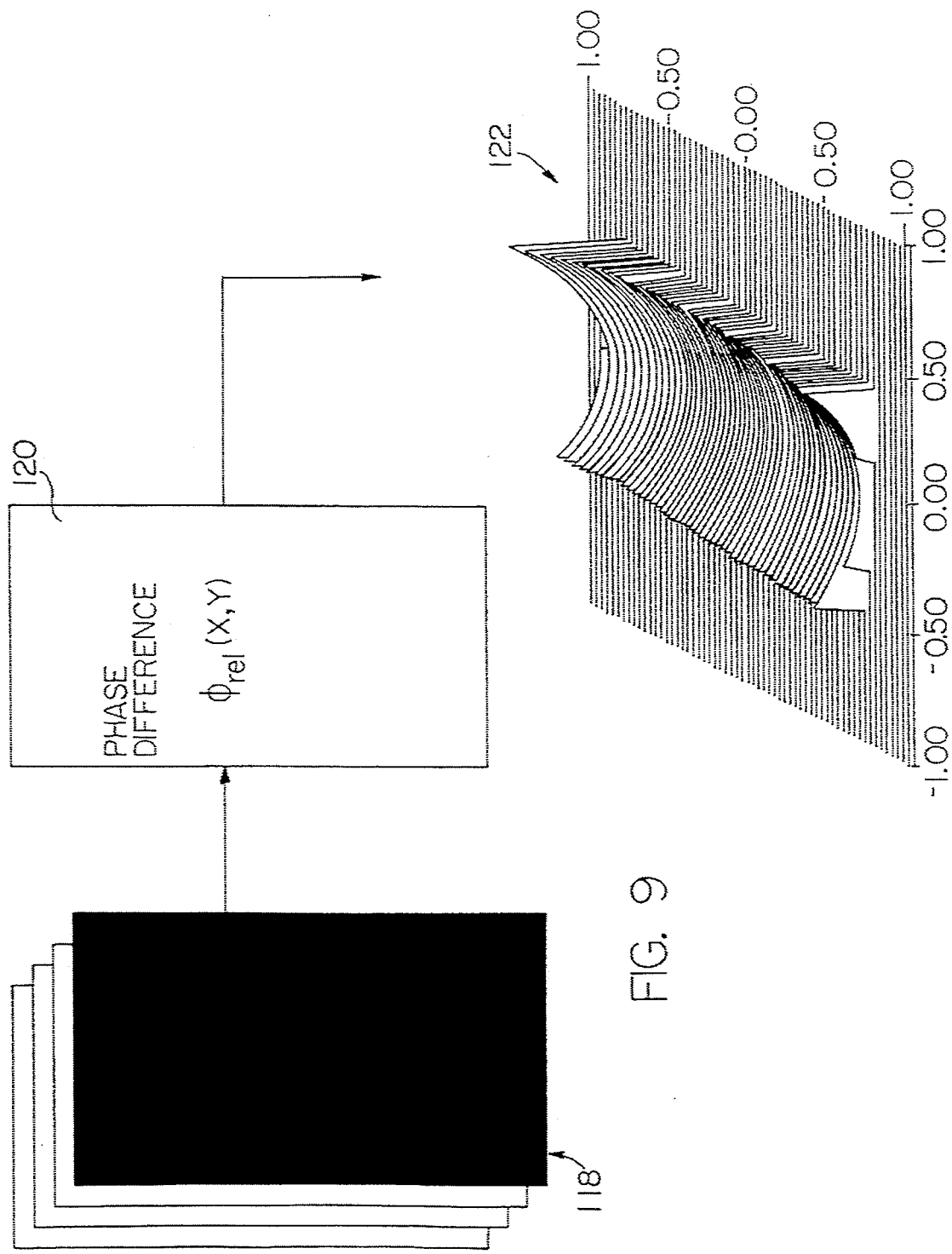
FIG. 9 is a diagrammatic illustration of a surface calculation of a jet engine turbine blade using phase modulation interferometry by the system of FIG. 4.

PMI can determine the quality of optical surfaces to 1/250 of the wavelength of the illuminating light. As seen schematically with respect to FIG. 9, several successive interferograms 118 of the object under test that differ by a defined change in the phase of the illuminating light. At 120 an intensity variation algorithm determines wavefront phase differences between pixels and yields a high resolution map of the optical surface being inspected. This technique is directly applicable to Moire Interferometry. With the present invention, the line pattern on the object is modulated and successive frames of known difference are recorded. An algorithm is then used to determine the contour of the surface as shown schematically at diagram 122. The relative height change is calculated from relative phase changes.

A Moire interferogram is produced when two sinusoidal intensity patterns are combined in some way. The resulting Moire intensity pattern consists of grey tones that are representative of the constructive and destructive interference between the two patterns. In optical interferometry, two beams are superimposed. One beam is usually used as a reference while the other goes through phase changes induced by height variations on the object being tested. The resulting intensity distribution can be represented by the following equation:

$$I(z) = I_0(z(1 + V\cos(2\pi \Delta z/\omega + \Delta\phi))$$

where:
$I_0(z)$ = amplitude as a function of height, z
$V$ = visibility
$\Delta z$ = optical path difference between two waves
$\Delta w$ = optical frequency difference between two waves
$\Delta\phi$ = phase difference between the two waves
$\lambda$ = wavelength of light.

Any variation in $\Delta z$, $\Delta\omega$, or $\Delta\phi$ will cause variations in the intensity pattern. The intensity pattern is usually captured by a video camera and stored for analysis. By controlling any one of these quantities it is possible to determine the optical path differences for each pixel in the field, i.e., the contour of the object being tested can be determined. In typical optical PMI systems, only $\Delta z$ is varied by known amounts (usually four one-quarter wave steps) by varying the length of the reference arm.

The resulting equation can then be solved for the entire video field:

$$I = I_0(1 + \cos(\phi + 2\pi\Delta z/\lambda)$$

where $\phi$ = unknown phase and $\Delta z$ = variable optical path difference. Using the four constraints $I_1 (\Delta z=0) = I_0 (1 + \cos\phi)$
$I_2 (\Delta z=e,\text{fra } 1/4\times) = I_0(1 - \sin\phi)$
$I_3 (\Delta z=\frac{1}{2}) = I_0 (1 - \cos\phi)$
$I_4 (\Delta z=3\frac{1}{4}) = I_0 (1 + \sin\phi)$ Equation (2) can be solved to yield $$\phi = \arctan\{(I_4 - I_2)/(I_1 - I_3)\}.$$

The phase is therefore determined for each pixel in the field. The relationship of the phases between adjacent pixels is directly related to the optical path difference (or heights). Thereafter, the phase map is used to construct the contour of the entire surface. Other algorithms that require more or less than four steps, may be substituted depending on the particular application.

In the case of Moire interferometry, it is not simply the phase of the object's sinusoid being modulated, the wavelength (or spatial frequency) is altered. It is this perceived changing wavelength that gives rise to the Moire contour pattern, since it is directly related to the slope changes across the surface. Since one of the two "waves" being mixed is of varying frequency the simple relationship above does not hold. However, a similar set of equations can be constructed in which the phase map, and thus the contour, can be determined. One method, very similar to the one shown above, uses a larger number (N) of intensity patterns to find the phase:

$$\tan\phi = \Sigma I_n \sin(2\pi n/N)/\Sigma I_n \cos(2\pi n/N).$$

Figure 4:
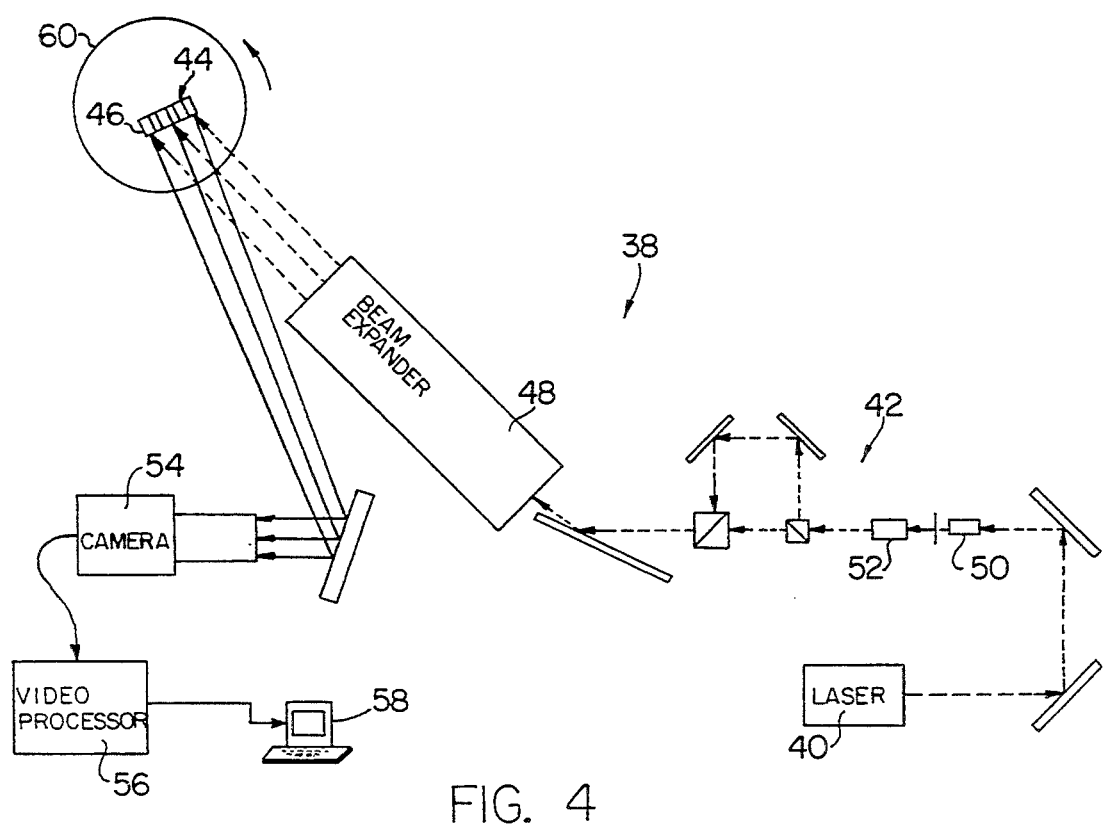
FIG. 4 is a schematic illustration of an optical system provided according to the present invention.
Figure 10:
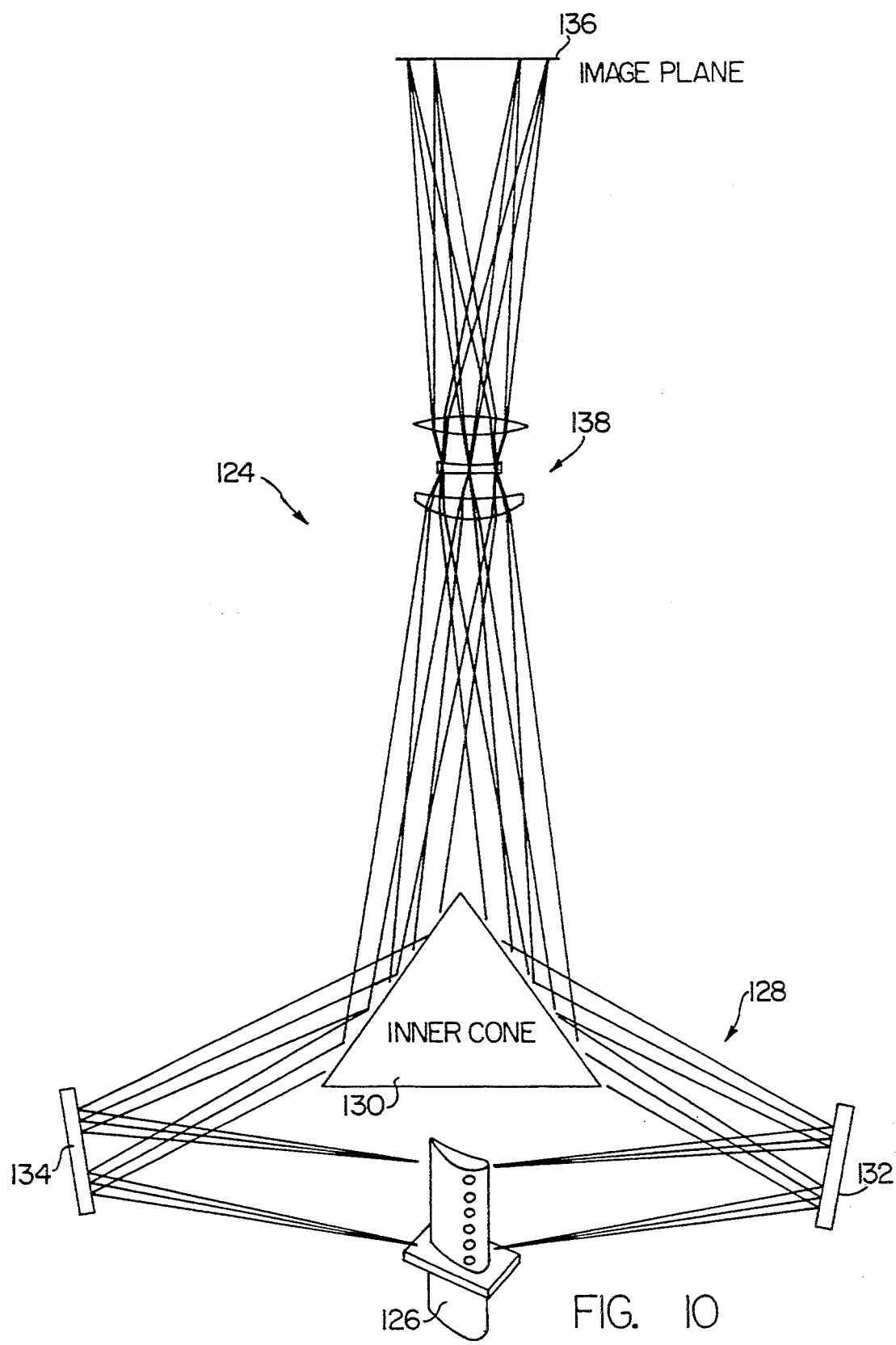
FIG. 10 is a schematic illustration of a system alternative to that of FIG. 4 capable of generating a complete surface contour from a single object position.

An alternative system 124 that incorporates a replacement for the moving object platform depicted in FIG. 10. The object 126 to be inspected is placed in the center of a cone-shaped reflective surface 128 formed by prism 130 and mirrors 132, 134 to generate a continuous image of the test object at image plane 136. The system also includes optics assembly 138 comprised of a camera lens with an effective focal length of 80 mm (f/4.5) and f/17.5 conjugate lenses. The total object distance is 300 mm with a reduction ratio of −3. Analysis of the Moire pattern in this image requires more sophisticated software than for the single view of FIG. 4. Such software is known to those skilled in the art. This alternative system eliminates the need for "stitching" several interferograms together to get a continuous surface measurement.

Figure 11:
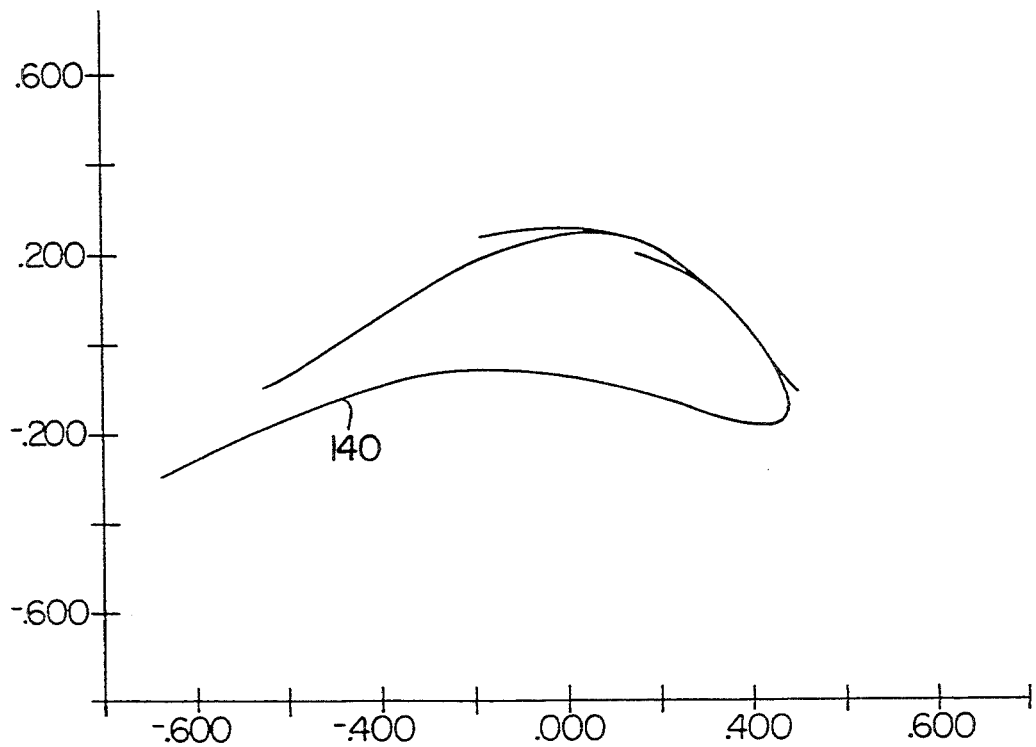
FIG. 11 is a diagram of a cross section of a jet engine turbine blade taken by a system provided according to the present invention wherein several interferograms are stitched together.

The present invention also has the capability to blend, or stitch together, four sectional views of a sample engine blade to create a 360 degree representation of the test object. Accuracies of 0.3 mil have been achieved. The ability of the present system to map the entire surface of the turbine blade depends on the repeatability of measurement when the same point on the object is included in two (or more) views. An example of the capabilities of the present system are shown in FIG. 11. Four overlapping views of an object were recorded by rotating it in front of the camera and interferometer. Cross sections were removed from each set of data at a particular height on the blade. These profiles were overlaid in software to form cross section plot 140. No artificial adjustment was made to the overlapping regions to achieve a continuous measurement through the slope inflection at the leading edge of the blade. The software used to "stitch" the profiles together only required rough coordinates and slope at two points in each of the overlapping views. The rigid body terms of the individual profiles were then adjusted to achieve a minimum rms scatter in the overlapping regions. The rms scatter (non-repeatability) between the overlapping views in FIG. 11 is 50 m-in.

The maximum camber and maximum thickness of a jet engine turbine blade at the location of the cross section has been measured with a micrometer for comparison with the data obtained by the present system:

|            | Maximum Camber | Maximum Thickness |
|------------|----------------|-------------------|
| Micrometer | 0.5332 inches  | 0.3067 inches     |
| Profile    | 0.5335 inches  | 0.3066 inches     |

The non-repeatability at the edges of the overlapping regions in FIG. 11 is due to the errors made by the fringe centroiding software in regions of oblique viewing angles. This effect can be eliminated by using phase measuring interferometry techniques described herein. The spurious data at the ends of the profiles can be ignored. As further assurance that this effect is a non-issue, the cross section data shows that even with edge effects a continuous cross section was successfully measured which is accurate in both overall physical dimensions and high frequency contour.

Similarly, although the invention has been shown and described with respect to a preferred embodiment thereof, it would be understood by those skilled in the art that other various changes omissions and additions thereto maybe made without departing from the spirit and scope of the present invention.

I claim:

1. A method for measuring contours on the surface of an object, comprising the steps of:
    illuminating the object surface with a beam of light whose intensity cross section includes periodically spaced regions of low intensity at a reference spatial frequency;
    receiving an image reflected off the object surface having regions of low intensity at an object spatial frequency;
    generating digital signal equivalents of said reflected object image;
    mixing said reflected object image digital signals with reference signals corresponding to a pattern having periodically spaced regions of low intensity at a reference spatial frequency to generate combined image signals;
    extracting, from said combined image signals, signals corresponding to an intensity pattern having regions of low intensity at a beat frequency; and
    generating output signals indicative of said beat frequency pattern.

2. The method of claim 1 wherein said object illumination step further comprises the steps of interfering two coherent beams, thereby generating said periodically spaced regions of low intensity to have an infinite depth of field.

3. The method of claim 1 wherein said object illumination step further comprises the steps of expanding said object surface beam.

4. The method of claim 1 wherein said object illumination step further comprises the steps of collating said object surface beam.

5. The method of claim 1 further comprising the steps of filtering said combined image signals to remove therefrom signals corresponding to a carrier frequency.

6. The method of claim 1 further comprising the steps of computing, from said output signals, signals indicative of surface contours of the object.

7. The method of claim 1 further comprising the steps of generating a plurality of sets of combined image signals, with each of said combined image signal sets obtained at different positions of the object relative to said light beam.

8. The method of claim 7 further comprising the steps of stitching said sets of combined image signals so as to generate a single combined image signal set corresponding to multiple images of the object.

9. The method of claim 1 further comprising the steps of generating an image beam that provides an image of all of said outer surface of the object in a single combined image signal set.

10. The method of claim 5 wherein said reference and said object spatial frequencies are higher than said beat frequency and wherein said filtering step further comprises the steps of filtering said combined image signals through a non-linear morphological dilation filter and smoothing said filtered signals.

11. The method of claim 1 further comprising the step of fringe centroiding said output signals wherein intensity centroids are calculated along each of dark and light fringes to generate signals corresponding to a three dimensional image of the object.

12. The method of claim 1 further comprising the steps of:
  generating a sequence of Moire interferogram signal sets comprises of an array of pixels, each interferogram signal set having a selected optical path length difference between the interfering beams;
  computing a pixel by pixel phase difference signal set for said interferogram signal sets; and
  computing from said pixel by pixel phase signal set a signal set indicative of relative height change of the object from said relative phase change.

13. The method of claim 12 wherein said phase difference is computed in accordance with the steps of:
  generating N interferograms;
  calculating phase using the equation:

$$\tan \phi = \Sigma I_n \sin (2\pi n/N)/\Sigma I_n \cos (2\pi n/N)$$

where
  $\phi$ = phase angle;
  N = number of interferograms
  n = selected pixel
  I = intensity at pixel, n.

14. The method of claim 5 wherein said filtering step includes the steps of comparing each of said combined signals against a threshold value and generating a signal indicative of a fringe should said compared signal exceed said threshold.

15. The method of claim 5 wherein said filtering step includes the steps of histogram equalization of said combined signals in said signal set.

16. The method of claim 5 wherein said fringe centroiding step further comprises the steps of linearly interpolating signal values in areas in between said light and dark fringes.

17. A system for measuring contours on the surface of an object, said apparatus comprising:
  a means for illuminating the object surface with a beam of light whose intensity cross section includes periodically spaced regions of low intensity at a reference spatial frequency;
  a means for receiving an image reflected off the object surface having regions of low intensity at an object spatial frequency;
  a means for generating digital signal equivalents of said reflected object image;
  a means for mixing said reflected object image digital signals with reference signals corresponding to a pattern having periodically spaced regions of low intensity at a reference spatial frequency to generate combined image signals;
  a means for extracting, from said combined image signals, signals corresponding to an intensity pattern having regions of low intensity at a beat frequency; and
  a means for generating output signals indicative of said beat frequency pattern.

18. The system of claim 17 wherein said object illumination means further comprises means for interfering two coherent beams, thereby generating said periodically spaced regions of low intensity to have an infinite depth of field.

19. The system of claim 17 wherein said object illumination means further comprises a means for expanding said object surface beam.

20. The system of claim 17 wherein said object illumination step further comprises a means for collating said object surface beam.

21. The system of claim 17 further comprising means for filtering said combined image signals to remove therefrom signals corresponding to a carrier frequency.

22. The system of claim 17 further comprising means for computing, from said output signals, signals indicative of surface contours of the object.

23. The system of claim 17 further comprising means for generating a plurality of sets of combined image signals, with each of said combined image signal sets obtained at different positions of the object relative to said light beam.

24. The system of claim 17 further comprising means for stitching said sets of combined image signals so as to generate a single combined image signal set corresponding to multiple images of the object.

25. The system of claim 17 further comprising means for generating an image beam that provides an image of all of said outer surface of the object in a single combined image signal set.

26. The system of claim 17 wherein said reference and said object spatial frequencies are higher than said beat frequency and wherein said filtering means further comprises a means for filtering said combined image signals through a non-linear morphological dilation filter and a means for smoothing said filtered signals.

27. The system of claim 17 further comprising a means for fringe centroiding said output signals wherein intensity centroids are calculated along each of dark and light fringes to generate signals corresponding to a three dimensional image of the object.

28. The system of claim 18 further comprising:
  a means for generating a sequence of Moire interferogram signal sets comprises of an array of pixels, each interferogram signal set having a selected optical path length difference between the interfering beams;
  a means for computing a pixel by pixel phase difference signal set for said interferogram signal sets; and
  a means for computing from said pixel by pixel phase signal set a signal set indicative of relative height change of the object from said relative phase change.

29. The system of claim 28 wherein said phase difference computing means further comprises:
  a means for generating N interferograms;
  a means for calculating phase using the equation:

$$\tan \phi = \Sigma I_n \sin (2\pi n/N)/\Sigma I_n \cos (2\pi n/N)$$

where
  $\phi$ = phase angle;
  N = number of interferograms
  n = selected pixel
  I = intensity at pixel, n.

30. The system of claim 21 wherein said filtering means includes means for comparing each of said combined signals against a threshold value and generating a signal indicative of a fringe should said compared signal exceed said threshold.

31. The system of claim 21 wherein said filtering means includes means for providing histogram equalization of said combined signals in said signal set.

32. The system of claim 27 wherein said fringe centroiding means further comprises means for linearly interpolating signal values in areas in between said light and dark fringes.

* * * * *